2,975,093
METHOD OF LAMINATING CELLULOSE FILMS

Robert W. Park, Stafford County, Va., assignor to American Viscose Corporation, Philadelphia, Pa., a corporation of Delaware No Drawing. Filed Dec. 16, 1958, Ser. No. 780,670

10 Claims. (Cl. 154—136)

The present invention relates to the production of laminated sheets or films of cellulosic material such as regenerated cellulose or derivatives of cellulose capable of being permeated with aqueous solution, such as the alkali-soluble cellulose ethers. The invention is concerned particularly with the production of heavy weight transparent films of regenerated cellulose and will be described primarily with respect to films derived by the viscose process.

This application is a continuation-in-part of application Serial No. 504,679, filed April 28, 1955, now abandoned.

At present, the preferred conventional method of manufacturing a heavy cellulose film is to extrude a single relatively heavy sheet of special, easily coagulated viscose into a coagulating bath containing special ingredients, e.g., an ingredient for eliminating bubbles. Further expense and inconvenience is entailed by such a process because it involves special color treatments and slow machine speeds not used in the production of the extensively used thin-gauge films such as films which weigh approximately 30 grams per square meter. In order to obtain a reasonably satisfactory heavy-gauge film from a single extrusion product it is necessary to modify the viscose solution in a manner which adversely affects the physical properties of the finished film. Also known are processes for producing heavy-gauge cellulose films by passing thin films through a bath containing an adhesive and then bringing the thin films together to form a laminated product. However, none of such processes are known to yield a product which may be dred without further treatment after passing from the adhesive-applying bath which is not tacky or self-adherent to itself, as for example, when the laminated product is packaged in rolls without a separating strip.

Thus, a primary object of the present invention is to provide a process for manufacturing highly transparent heavy-gauge films of laminated construction which does not necessitate an additional surface treatment to render the dried film non-tacky. Another object is to substantially reduce the cost of heavy-gauge cellulose films. Another object is to provide heavy-gauge films which have softness and pliability to the degre desired. It is still another object to produce heavy-gauge film in accordance with the foregoing objects which is generally superior in its physical properties to the heavy cellulose films presently preferred in the trade. A further object in obtaining a laminated cellulose film is to apply the adhesive to the component laminae within a conventional process of the manufacturing therefor while the laminae are in a wet condition and preferably in the wet gel state.

The invention, in brief, is concerned with the production of a laminated cellulose film permeated with polyvinyl alcohol acting to adhere the laminae and having non-tacky outer surfaces. The process for the manufacturing thereof comprises casting, coagulating or regenerating, washing, removing contaminants, and bleaching simultaneously along the same general path, a plurality of cellulose sheets of the same weight or gauge as normally cast in the production of thin gauge film. In the final liquid treating step before drying, and preferably while the material of the sheets is in the gel state, the sheets are passed through a bath containing polyvinyl alcohol and a polyvinyl ester, such as polyvinyl acetate, in an amount that is considerably less than that of the polyvinyl alcohol.

To meet the requirements of the present invention, the concentration of the polyvinyl resinous material dissolved or suspended in the bath lies in that range below which laminae impregnated with bath liquid are not dependably adherent, and above which the outer surfaces of the dried laminated product are self-adherent. At concentrations within the range, a dried product is derived in which the laminae are completely adhered and the outer surfaces are non-tacky. In a preferred embodiment of this invention, a plasticizer such as glycerine or ethylene glycol and the adhesive agent are applied to the laminae during the passage thereof through the bath. The laminae may be brought together before, during, or after their passage through the bath. The lowest practical concentration of the essentially polyvinyl alcoholic material carried in the impregnating liquid of the bath is about 0.1 percent; the highest percentage is about 3 percent. Preferred concentrations allowing economical use of the polyvinyl alcohol while effecting thorough adhesion fall within the range of 0.3 to 0.5 percent of the bath or dipping solution, although higher concentrations than this preferred range may be used within the scope of the invention as long as the concentration used does not result in a tacky surface condition of the dried heavy-gauge laminated film.

The term "polyvinyl alcohol" as used herein refers generally to the commercially obtainable product resulting from the hydrolysis of polyvinyl acetate until a preponderate portion of the theoretical acetyl maximum is split off. However, the presence of the small percentage of acetyl groups remaining is desired since the adhesive character of the polyvinyyl mixture as a whole is believed to be improved thereby. The amount of polyvinyl acetate, other polyvinyl ester, or other saponifiable polyvinyl derivative in the polyvinyl alcoholic composition of this invention may vary from about 5 to 25 percent; in other words the polyvinyl alcohol content of the polyvinyl alcoholic composition of this invention may vary between about 75 and 95%. As a practical matter, a polyvinyl alcoholic composition in which there is present about 11 to 13 percent unhydrolyzed polyvinyl component (i.e., 87 to 89 percent polyvinyl alcohol) yields fully satisfactory lamination when applied under the operating conditions hereinafter described.

The dried laminated film produced in accordance with this invention may be used in the uncoated or coated state. However, impregnation by the preferred polyvinyl alcohol composition renders the dried film receptive to coating compositions. The bath containing the polyvinyl alcohol may include other materials such as anchoring agents, moistureproof coating, plasticizers, or other materials commonly added to the finishing solution. For example, glycerine which is regularly used as a plasticizer for cellophane is advantageously included in the bath for applying polyvinyl alcohol to the laminae which form the film.

The component films or laminae which are joined after passage through the polyvinyl alcohol bath to produce the laminated film may be obtained by passing the component films together while superimposed as disclosed in Hill Patent No. 1,590,595, Pownall (British) 423,365, or application Serial No. 245,612, now Patent No. 2,862,245. The present invention contemplates also that the component films may be produced in separate systems by separately casting, regenerating, and purifying each component film in the conventional manner, and then bringing it into superposed relation while in the wet condition with the other component films either before or immediately after passage through the polyvinyl alcohol bath. However, for most efficient utilization of the invention, passage of the component films in superposed relation through the same treatments is the preferred practice since it avoids duplication of the coagulating, regenerating, purifying, and polyvinyl alcohol-applying apparatus.

In a preferred embodiment illustrated hereinbelow, the wet gel sheet material is illustrated in the form of regenerated cellulose derived from viscose. Obviously, regenerated cellulose prepared by the cuprammonium process, or derived from cellulose esters (e.g., nitrocellulose), is suitable also. Still further, as indicated above alkali-soluble ethers of cellulose which are swollen, but not dissolved, by water, are suitable materials for the present invention. A preferred example of these ethers is hydroxyethyl cellulose; others within the scope of the present invention include carboxymethyl cellulose and the methyl, ethyl and benzyl ethers of cellulose.

In principle or practice there is no essential difference in processing two, or more than two, superposed films to form the laminated sheet of the invention. As double sheet films satisfy the present requirements of the trade and permit the laminated film manufacturer to use the types of casting solutions which produce high strength thin gauge films (but must be detrimentally modified for making single ply heavy gauge films), the following examples illustrate procedures by which laminated heavy gauge films may be obtained.

*Example I*

Two superposed sheets of film regenerated from viscose solution, each film having approximately the gauge corresponding to a weight of 30 grams per square meter in the finished dry condition, were cast, regenerated, and purified by the normal double spinning procedure. The sheets were brought together after leaving the last bath which contained 6 percent of a 60-40 ethylene glycol-glycerol mixture and run as one double sheet through a dryer along a zig-zag path provided by six upper rolls and five lower rolls. The first three rolls over which the double sheet passed were heated by steam at 10 p.s.i. pressure; the next three rolls were heated with water at 72° C., and five were not heated. The sheets passed from these rolls in partially dried condition and were then separated to pass along separate paths through a dip pan which had two non-rotatable glass rolls in it, one above the other. The top sheet was passed under the top roll whereas the lower sheet was passed under the lower roll. The rolls were curved so that they bowed in the windup direction for the purpose of preventing the wrinkling which tends to occur in rewetting a partially dry sheet. The dip pan contained a solution comprising 6 percent of the 60-40 ethylene glycol mixture and 0.3 percent of polyvinyl alcohol (Elvanol 51-05). The level of the solution was maintained above the upper roll to allow the solution to come between the single sheets. The sheets were brought back together and passed through a set of resilient squeeze rolls to extract excess liquid and to laminate without the formation of air pockets the single sheets into a wet laminated film. The top squeeze roll exerted a pressure of 24 p.s.i. per inch of width and had a Shore Durometer hardness of about 40. The Shore Durometer hardness of the bottom squeeze roll was about 96. Upon leaving the squeeze rolls, the now laminated sheet was threaded through a conventional cellophane dryer comprising 44 dry rolls which were heated to 72° C. and 58 rolls heated at 62° C. The product issuing from the dryer was a thoroughly dried film of a laminated construction, visually indistinguishable from a heavy single ply film and having no tendency for the plies or laminae to separate.

*Example II*

Two superposed films regenerated from viscose solution, each film being of the gauge which weighs approximately 30 grams per square meter in the finished dry condition, were cast, regenerated, and purified by the normal double-spinning procedure. The last bath of wet or liquid-treatment section of the spinning contained 7 percent glycerine, sodium carbonate to maintain the pH to 8.0, and 0.5 percent polyvinyl alcohol (Elvanol 51-05, 86 to 89 percent hydrolyzed). This bath was heated to 50° C. As the films passed through this bath they were separated by guides to allow the solution to contact the inner opposed surfaces. As the films issued from this bath they passed along a zig-zag path defined by several rounded edge glass scrapers arranged to contact opposite sides of the films and thus remove excess solution. Scrapers positioned adjacently above the bath wiped the inner opposed surfaces of the films before they came together along the zig-zag path. The films were brought together into laminated relationship as they were drawn over one of the scrapers with sufficient tautness and angular change of path to prevent the formation of air bubbles between the laminae. Thereafter the laminated sheet was passed through a conventional paper dryer operated in the usual manner for drying sheets of heavy-gauge cellophane. The dried laminated film was indistinguishable from a single ply heavy film and showed no tendency for the laminae to separate.

*Example III*

Two 900 pound (net weight of the film) 5000 yard rolls of cellophane weighing approximately 60 grams per square meter were made in accordance with double-spinning casting, regenerating, and purifying procedures of Examples I and II. In making each roll, two wet single-ply sheets of film were brought together and passed as a single double-ply sheet through a bath at 50° C. containing 0.5 percent polyvinyl alcohol and 7 percent glycerine. The opposite surfaces of the double sheet were scraped free of liquid, passed through squeeze rolls, and thereafter passed through a conventional dryer. The dried laminated product of the drier had the appearance of a single ply film with excellent strength and clarity with respect to transparency, and without surface striations or other surface distortion. The plies of the laminated film were resistant to separation force in excess of 450 grams per centimeter.

In practicing the invention as hereinabove described, it is apparent that high-strength heavy-gauge films may be produced in a more economical manner than has been heretofore obtainable by the conventional commercially prevailing methods by using the preferred procedure taught herein, i.e., by conducting a plurality of sheets over a common path of regeneration, purification, application of the laminating adhesive and plasticizer or modifying agent, and drying. The important feature of the procedure, as related to the lamination of the component films and the non-tackiness of the laminated product, is the composition of the bath for applying the laminating adhesive.

Various changes and modifications may be made in practicing the invention without departing from the spirit and scope thereof and, therefore, the invention is not to be limited except as defined in the appended claims.

I claim:

1. A process of preparing a laminated film comprising impregnating a plurality of wet gel single-ply films selected from the group consisting of films derived from regenerated cellulose and films derived from alkali-soluble cellulose ethers with a solution containing an amount of polyvinyl alcohol between about 0.1 and about 3% of said solution, bringing the impregnated films into intimate optical contact to produce a laminated wet gel film and drying said laminated film until the outer surfaces thereof are non-adhesive.

2. The method of claim 1 further characterized in that the solute of said impregnating solution consists of from about 75 to 95% polyvinyl alcohol and the remainder thereof consists of a saponifiable polyvinyl compound.

3. The process of claim 1 further characterized in that said impregnating solution also contains a plasticizer selected from the group consisting of glycerine and ethylene glycol.

4. The process of claim 1 further characterized in that said single-ply films are in fully engaged contact when impregnated with said impregnating solution.

5. The process of claim 1 further characterized in that said single-ply films are impregnated with said impregnating solution while passing said single-ply films along individual paths.

6. The process of claim 1 further characterized in that after impregnation the exposed surfaces of said single-ply films are scraped by means of rounded surface guides to prevent wrinkle formation and to strip excess liquid from said surfaces.

7. A process for the continuous production of a laminated regenerated cellulose film which comprises passing a pair of continuous running lengths of purified wet gel regenerated cellulose films through a bath containing 0.1 to 3% by weight of polyvinyl alcohol so as to coat all four sides of the film and to impregnate said films, withdrawing said impregnated and coated films from said bath and bringing them into intimate optical contact so as to form a single laminated sheet and drying said laminated sheet until the film components thereof are firmly adhered together and the outer surfaces of said sheet are non-tacky.

8. The process of claim 7 further characterized in that the solute in said bath consists of from about 75 to 95% polyvinyl alcohol and the remainder thereof consists of a saponifiable polyvinyl compound.

9. The process of claim 7 further characterized in that said bath also contains a plasticizer selected from the group consisting of glycerine and ethylene glycol.

10. A process of preparing a continuous laminated regenerated cellulose film which comprises the consecutive steps of casting, regenerating, and purifying a plurality of single-ply films, passing said films in the wet gel state through a bath containing 0.3 to 0.5% by weight of an adhesive composition consisting of about 75 to 95% polyvinyl alcohol and 5 to 25% of a saponifiable polyvinyl compound, withdrawing said films from said bath, stripping excess liquid from the exposed surfaces of said films, bringing them into intimate optical contact to form a single laminated film, and drying said single laminated film in a heated atmosphere until the outer surfaces thereof are non-adhesive and the inner surfaces are firmly adhered together.

References Cited in the file of this patent

UNITED STATES PATENTS

| | | |
|---|---|---|
| 2,709,146 | Berry et al. | May 24, 1955 |
| 2,734,012 | Downing | Feb. 7, 1956 |
| 2,812,279 | Nadeau | Nov. 5, 1957 |